(12) United States Patent
Madasu et al.

(10) Patent No.: US 11,414,959 B2
(45) Date of Patent: Aug. 16, 2022

(54) OPERATING WELLBORE EQUIPMENT USING A DATA DRIVEN PHYSICS-BASED MODEL

(71) Applicant: LANDMARK GRAPHICS CORPORATION, Houston, TX (US)

(72) Inventors: Srinath Madasu, Houston, TX (US); Keshava Prasad Rangarajan, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 234 days.

(21) Appl. No.: 16/754,233

(22) PCT Filed: Nov. 13, 2017

(86) PCT No.: PCT/US2017/061252
§ 371 (c)(1),
(2) Date: Apr. 7, 2020

(87) PCT Pub. No.: WO2019/094037
PCT Pub. Date: May 16, 2019

(65) Prior Publication Data
US 2020/0277851 A1    Sep. 3, 2020

(51) Int. Cl.
*E21B 34/16* (2006.01)
*E21B 49/08* (2006.01)
(Continued)

(52) U.S. Cl.
CPC .............. *E21B 34/16* (2013.01); *E21B 43/12* (2013.01); *E21B 47/06* (2013.01);
(Continued)

(58) Field of Classification Search
CPC ...... E21B 34/16; E21B 43/12; E21B 2200/22; G05B 13/027; G06N 3/08
See application file for complete search history.

(56) References Cited

U.S. PATENT DOCUMENTS

| | | |
|---|---|---|
| 2005/0038603 A1 | 2/2005 | Thomas et al. |
| 2007/0185696 A1 | 8/2007 | Moran et al. |
(Continued)

FOREIGN PATENT DOCUMENTS

WO    2014160464 A2    10/2014

OTHER PUBLICATIONS

CA Application No. CA3,077,299, Office Action, dated May 18, 2021, 5 pages.
(Continued)

*Primary Examiner* — Tara Schimpf
(74) *Attorney, Agent, or Firm* — Kilpatrick Townsend & Stockton LLP

(57) ABSTRACT

Aspects of the present disclosure relate to receiving data associated with a subterranean reservoir to be penetrated by a wellbore and training a neural network with both the data and a physics-based first principles model. The neural network is then used to make predictions regarding the properties of the subterranean reservoir, and these predictions are in turn used to determine one or more controllable parameters for equipment associated with a wellbore. The controllable parameters can then be used to control equipment for formation, stimulation, or production relative to the wellbore.

18 Claims, 4 Drawing Sheets

(51) Int. Cl.
*E21B 47/06* (2012.01)
*G06N 3/08* (2006.01)
*G05B 13/02* (2006.01)
*E21B 43/12* (2006.01)
*E21B 43/25* (2006.01)

(52) U.S. Cl.
CPC ........ *E21B 49/0875* (2020.05); *G05B 13/027* (2013.01); *G06N 3/08* (2013.01); *E21B 43/25* (2013.01); *E21B 2200/20* (2020.05); *E21B 2200/22* (2020.05)

(56) References Cited

U.S. PATENT DOCUMENTS

| | | | |
|---|---|---|---|
| 2008/0065362 A1* | 3/2008 | Lee | E21B 41/00 703/10 |
| 2013/0066445 A1 | 3/2013 | Wang et al. | |
| 2014/0262235 A1 | 9/2014 | Rashid et al. | |
| 2015/0300151 A1 | 10/2015 | Mohaghegh | |
| 2016/0042272 A1 | 2/2016 | Mohaghegh | |
| 2016/0230513 A1* | 8/2016 | Dykstra | E21B 33/13 |
| 2017/0198553 A1 | 7/2017 | Dykstra et al. | |
| 2019/0093455 A1* | 3/2019 | Xiao | E21B 41/0092 |

OTHER PUBLICATIONS

Biazar, et al., "Exact and Numerical Solutions For Non-Linear Burger's Equation By VIM", Mathematical and Computer Modelling, vol. 49, 2009, pp. 1394-1400.

Hayati, et al., "Feedforward Neural Network for Solving Partial Differential Equations", Journal of Applied Sciences, vol. 7, No. 19, Dec. 2007, pp. 2812-2817.

Lagaris, et al., "Artificial Neural Networks for Solving Ordinary And Partial Differential Equations", IEEE Transactions on Neural Networks, May 19, 1997, pp. 1-26.

Ling, et al., "Reynolds Averaged Turbulence Modelling Using Deep Neural Networks with Embedded Invariance", J. Fluid Mech., vol. 807, 2016, pp. 155-166.

PCT/US2017/061252, "International Search Report and Written Opinion", dated Aug. 13, 2018, 24 pages.

Tompson, et al., "Accelerating Eulerian Fluid SimulationWith Convolutional Networks", Proceedings of the 34th International Conference on Machine Learning, Jun. 22, 2017, 10 pages.

\* cited by examiner

OPERATING WELLBORE EQUIPMENT USING A DATA DRIVEN PHYSICS-BASED MODEL

TECHNICAL FIELD

The present disclosure relates generally to devices for use in well systems. More specifically, but not by way of limitation, this disclosure relates to control of equipment used for wellbore formation, stimulation, or production.

BACKGROUND

A well system (e.g., an oil or gas well system) can include a wellbore drilled through a subterranean formation. The subterranean formation can include a rock matrix permeated by the oil or gas that is to be extracted. The oil or gas distributed through the rock matrix can be referred to as a "reservoir." Reservoirs are often modeled with standard statistical techniques in order to make predictions or determine parameter values that can be used in drilling, stimulation or production to maximize the yield of oil or gas from the subterranean formation. As one example, partial differential equations referred to as the "black-oil" equations can be used to model a reservoir based on production ratios and other production data.

DETAILED DESCRIPTION

Figure 1:
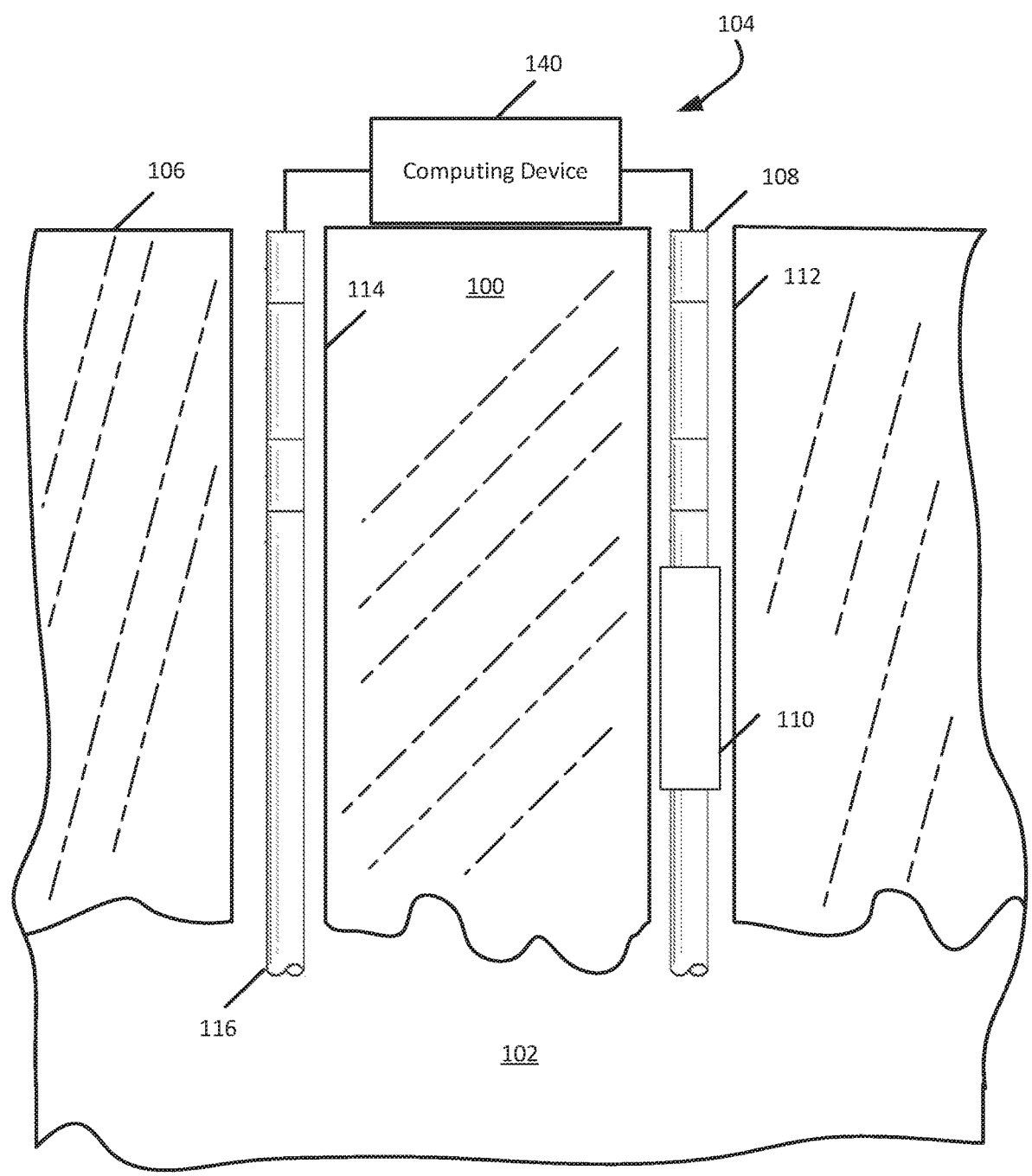
FIG. 1 is a cross-sectional view of an example of a reservoir that is subject to data gathering and the subsequent use of a data and physics-based model to operate production equipment according to some aspects.

Certain aspects and features of the present disclosure relate to receiving data associated with a subterranean reservoir to be penetrated by a wellbore and training a neural network with both the data and a physics-based first principles model. The neural network is then used to make predictions regarding the properties of a reservoir that includes hydrocarbons, and these predictions are in turn used to determine one or more controllable parameters for equipment associated with the wellbore.

Existing methods of reservoir modeling either rely on a physical model alone, or on statistical analysis of data alone. By combining both a physics-based model and actual data for a reservoir, higher accuracy of predictions and hence control parameters based on those predictions can be achieved.

The disclosed method and system offers a formulation based on neural network principles to formulate a loss function (sometimes called a "cost function") based on both a physics-based first principles model and a data driven model. A conventional neural network cost function consists of only the data driven formulation. The cost function described herein consists of two linearly superimposed formulations namely, a physics model based on assumptions and actual data. The loss function is minimized to make predictions. The fundamental formulation change couples the physics and the real data by giving the neural network an understanding of both physics and data. This formulation can make neural networks smarter and significantly contributes to the field of artificial intelligence (AI) used for automation of equipment. This formulation can be used for de-noising the data as well as for satisfying the physics-based model.

The disclosed formulation is based on a physics model and data for predicting variables using the neural network. The neural network cannot learn physics from data alone. Fundamentally, most neural networks do not understand the physical process. The major physics and engineering aspects of problems that neural networks are used to solve are usually very complicated and quite often the data comes with a high degree of uncertainty. The disclosed approach offers a fundamental change in the formulation for a neural network to predict impacts and can make applications using predictions of impacts significantly more accurate.

Current reservoir models include significant data uncertainty associated in the sub-surface data, and physics is not taken into account. The new formulation overcomes the shortcomings in both physics-based and data-driven models to make predictions more accurate. The underlying physics alone is too complicated to resolve. Hence, the formulation based on both physics and data described herein overcomes the shortcomings of using data or physics alone. The formulation provides a precise model for prediction of variables in a neural network framework. The predictions are high resolution and accurate.

Illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of an example subterranean formation 100 with a reservoir 102 that is subject to data gathering and the subsequent use of a data-driven physics-based model to manage equipment associated with a wellbore. System 104 includes computing device 140 disposed at the surface 106, of subterranean formation 100, as well as equipment 108, which in this example is a production string including a subsurface valve 110. Production string 108 is disposed in wellbore 112. It should be noted that while wellbore 112 is shown as a vertical wellbore, the wellbore can additionally or alternatively have a substantially horizontal section in which valve 110 is located.

Still referring to FIG. 1, computing device 140 receives data from another wellbore, 114. This data is received from equipment 116, which can be another production string with sensors (not shown) that feed signals to computing device 140. Data can include characteristics of the reservoir 102 such as viscosity, velocity and fluid pressure as these quantities spatially vary. The data, associated with the subterranean reservoir is used to train a neural network in computing device 140. In the example of FIG. 1, data from the second wellbore 114 is used to train the neural network to control equipment in the first wellbore 112. While these two wellbores are being illustrated as operating concurrently, in a typical well system, the data from the second wellbore is stored in computing device 140 and used to operate the first wellbore at a later time. It is also possible to train with data gathered from a wellbore, and use the neural network to control equipment in the same wellbore at later times. In some aspects the data can be considered "real-time" data since it is typically collected as some kind of wellbore equipment is being operated, even if it stored for later use with equipment in another wellbore. It should be noted that the terms "first" and "second" as related to wellbores or any other feature herein are assigned for convenience of description and can be reversed as appropriate for grammatical context.

Figure 2:
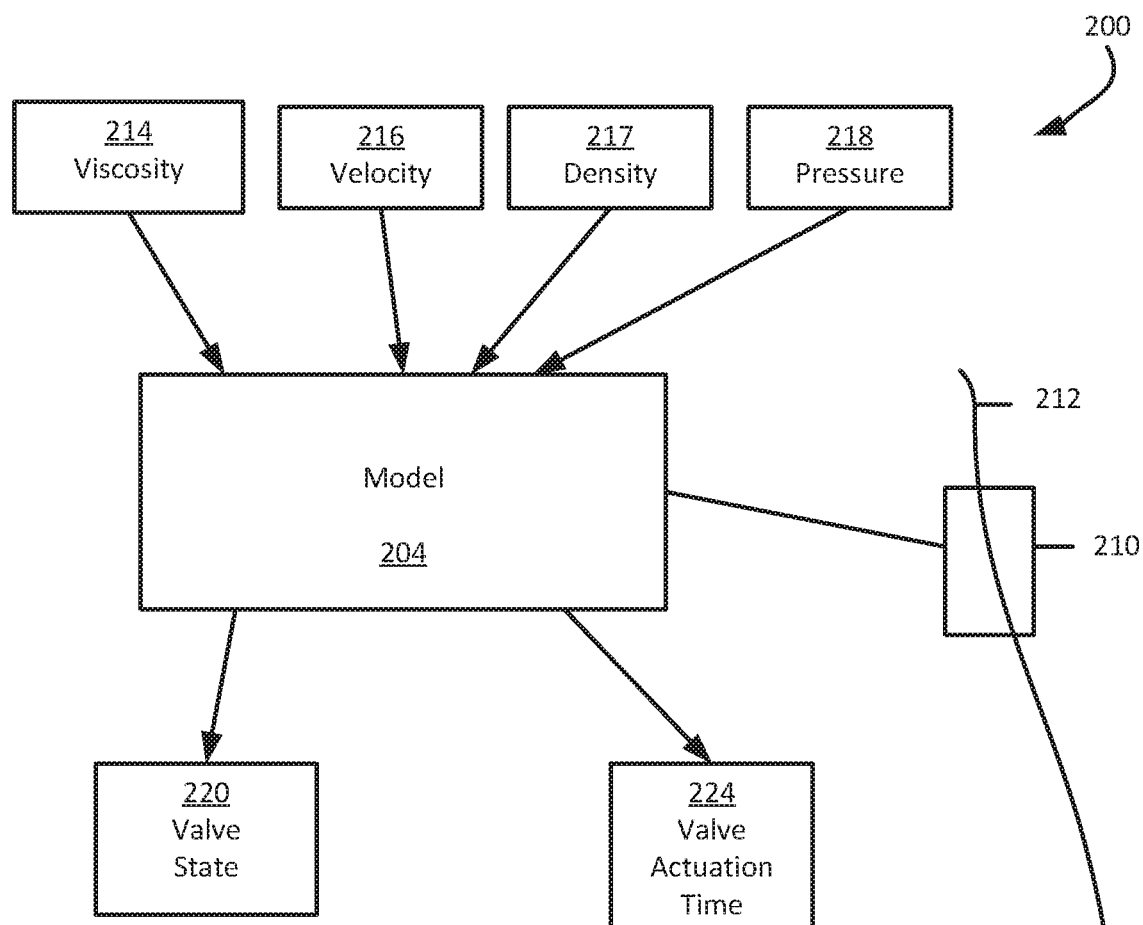
FIG. 2 is a schematic diagram of a system for controlling equipment associated with a wellbore using a data and physics-based model according to some aspects.

FIG. 2 is a schematic diagram of system 200 that uses a neural network to control equipment in a wellbore. Computer program instructions include the model 204 that can be executed by a processor to apply both data associated with a subterranean reservoir and physics-based first principles to control equipment 210 associated with wellbore 212. Input data may include values for viscosity 214, values for velocity 216, values for density 217, and values for pressure 218. Any or all of these values can vary spatially. The equipment can be for any of various uses, including but not limited to wellbore formation, wellbore stimulation, or wellbore production. Typically, a controllable parameter is applied to the equipment 210 over multiple iterations. If equipment 210 is a valve to minimize water production, the controllable parameters can include valve state 220 and valve actuation time 224.

Figure 3:
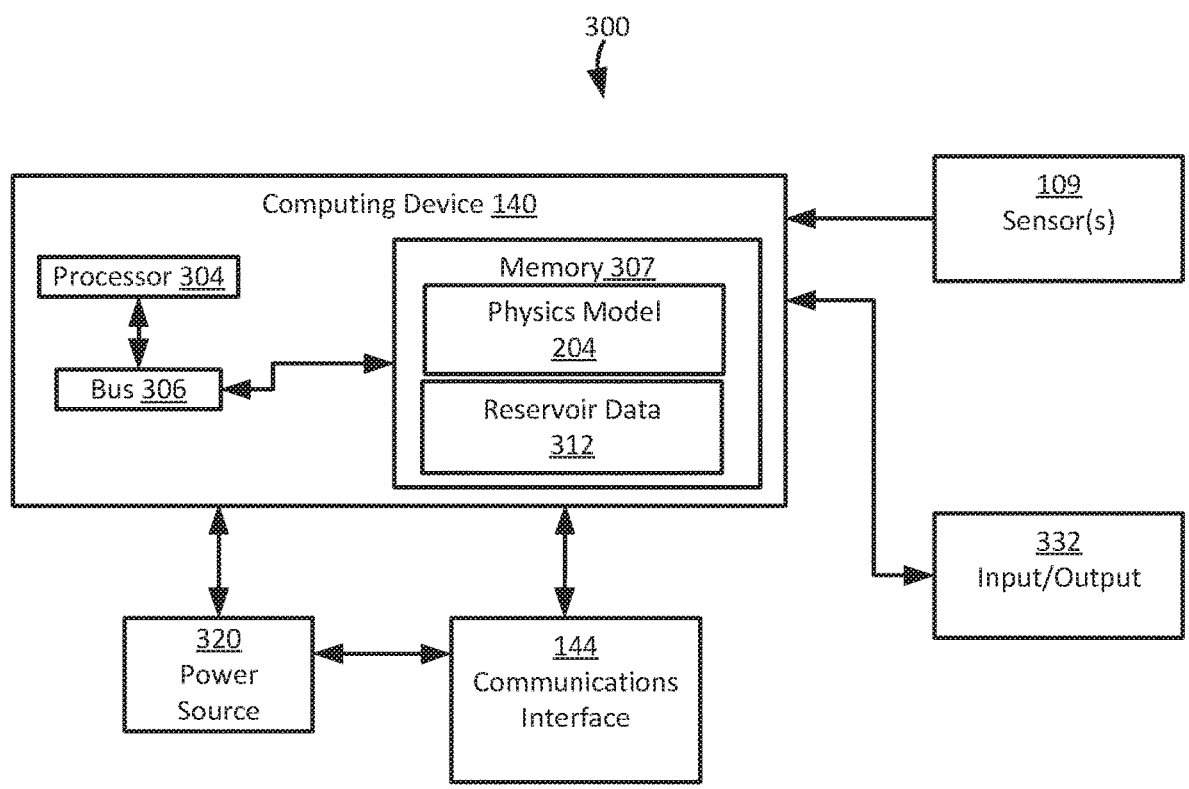
FIG. 3 is a block diagram of a system for producing and using a data and physics-based model to operate wellbore equipment according to some aspects.

FIG. 3 is a block diagram of an example of a system 300 that uses a neural network to control equipment associated with a wellbore according to some aspects. In some examples, the components shown in FIG. 3 (e.g., the computing device 140, power source 320, and communications interface 144) can be integrated into a single structure. For example, the components can be within a single housing. In other examples, the components shown in FIG. 3 can be distributed (e.g., in separate housings) and in electrical communication with each other.

The system 300 includes a computing device 140. The computing device 140 can include a processor 304, a memory 307, and a bus 306. The processor 304 can execute one or more operations for obtaining data associated with the subterranean reservoir and controlling equipment associated with a wellbore that is to penetrate or is penetrating the subterranean reservoir. The processor 304 can execute instructions stored in the memory 307 to perform the operations. The processor 304 can include one processing device or multiple processing devices. Non-limiting examples of the processor 304 include a Field-Programmable Gate Array ("FPGA"), an application-specific integrated circuit ("ASIC"), a microprocessor, etc.

The processor 304 can be communicatively coupled to the memory 307 via the bus 306. The non-volatile memory 307 may include any type of memory device that retains stored information when powered off. Non-limiting examples of the memory 307 include electrically erasable and programmable read-only memory ("EEPROM"), flash memory, or any other type of non-volatile memory. In some examples, at least part of the memory 307 can include a medium from which the processor 304 can read instructions. A non-transitory computer-readable medium can include electronic, optical, magnetic, or other storage devices capable of providing the processor 304 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 307 can include computer program instructions for executing and using the data and physics-based model 204 to train a neural network. The physics model is linearly superimposed with the reservoir data 312 so that the neural network can be used to determine one or more controllable parameters for equipment associated with the wellbore.

The system 300 can include a power source 320. The power source 320 can be in electrical communication with the computing device 140 and the communication interface 144. Communication interface 144 can be connected to wellbore equipment used for formation, stimulation, or production. In some examples, the power source 320 can include a battery or an electrical cable (e.g., a wireline). In some examples, the power source 320 can include an AC signal generator. The computing device 140 can operate the power source 320 to apply a signal to the communication interface 144 to operate the equipment used for wellbore formation, wellbore stimulation or wellbore production with controllable parameters. For example, the computing device 140 can cause the power source 320 to apply a voltage with a frequency within a specific frequency range to the communication interface 144. In other examples, the computing device 140, rather than the power source 320, can apply the signal to communication interface 144.

The communication interface 144 of FIG. 3 can include or can be coupled to a wireless communication system to control equipment remotely. In some examples, part of the communications interface 144 can be implemented in software. For example, the communications interface 144 can include instructions stored in memory 307. The communications interface 144 can receive signals from remote devices and transmit data to remote devices. For example, the communications interface 144 can transmit wireless communications that are modulated by data. In some examples, the communications interface 144 can receive signals (e.g., associated with data to be transmitted) from the processor 304 and amplify, filter, modulate, frequency shift, and otherwise manipulate the signals.

The system 300 can receive input from sensor(s) 109, which can be deployed in first wellbore 114 shown in FIG. 1. System 300 in this example also includes input/output interface 332. Input/output interface 332 can connect to a keyboard, pointing device, display, and other computer input/output devices. An operator may provide input using the input/output interface 332. Such input may include a selected controllable parameter for the particular wellbore on a particular job.

Figure 4:
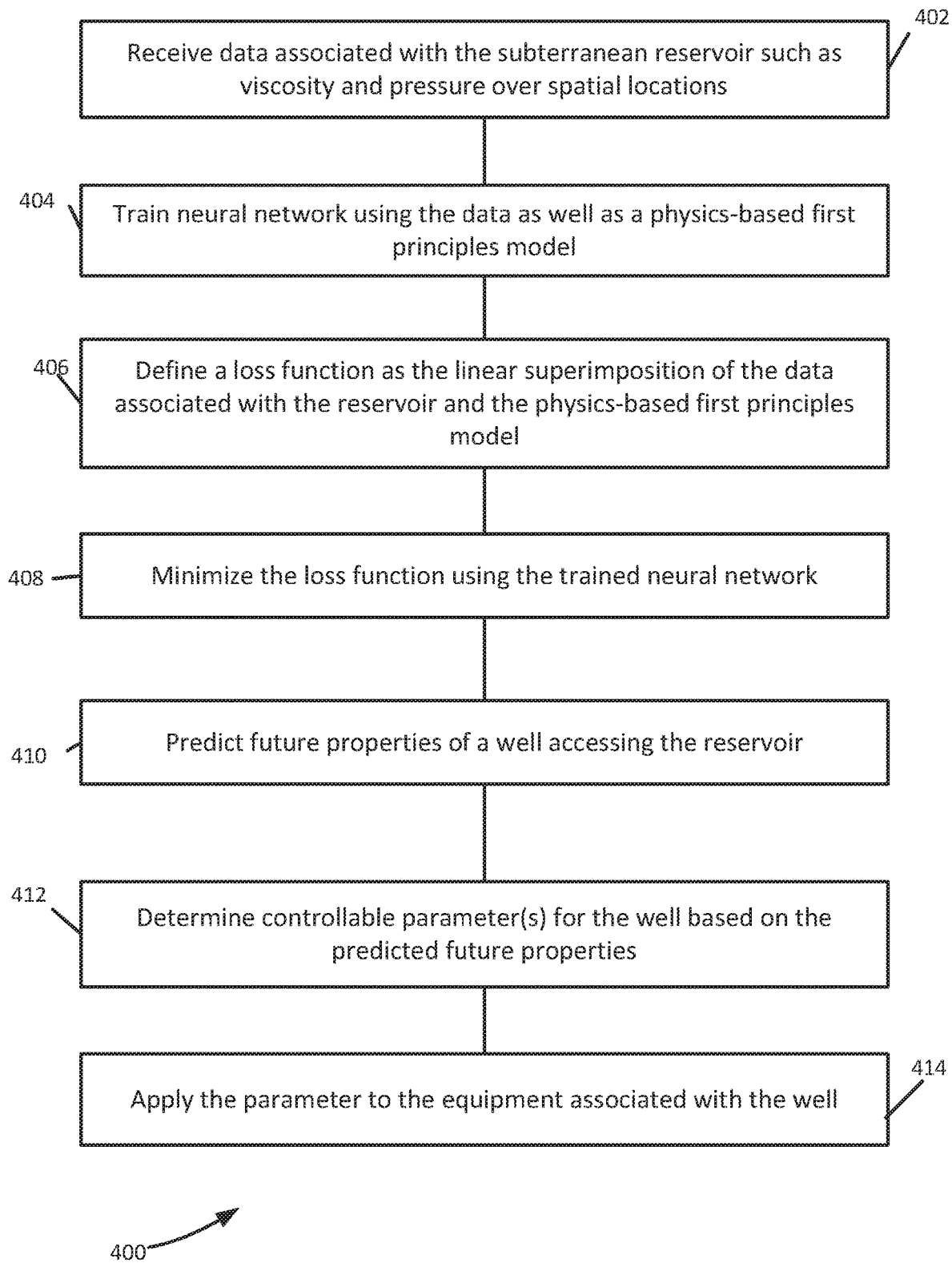
FIG. 4 is a flowchart of an example process for producing and using a data and physics-based model of a reservoir to operate wellbore equipment according to some aspects.

FIG. 4 is a flowchart of an example process 400 for producing and using a data and physics-based model of a reservoir, At block 402, a computing device receives data associated with the subterranean reservoir, such as viscosity and pressure over spatial locations. In the example of FIG. 1, this data is received from wellbore 114 by computing device 140. At block 404, a neural network is trained using the data associated with a subterranean reservoir as well as a physics-based first principles model. At block 406, the computing device defines a loss function as a linear superimposition of the data associated with the reservoir and the physics-based first principles model. The loss function is minimized at block 408.

The loss function or cost function is a linear superimposition of the physics and data:

COST=Physics Formulation+Data (1)

Where the "Physics Formulation" includes a first principles model and boundary conditions built into it and the "Data" includes the actual observed data.

For the first-principles physics model, a one-dimensional Navier-Stokes equation can be used:

$u_t + uu_x - \mu u_{xx} - p_x = 0$ $u_x = 0$ (2)

The boundary conditions and the initial condition are:

$u=t$ at $x=0$ $p=x$ at $x=1$ $u=0$ at $t=0 \forall x$ (3)

Where $\mu$ is the viscosity, x is the spatial location, t is the time, p is the pressure and u is the velocity. The analytical solution is:

$u=t$ $p=x$

Returning to FIG. 4, future predictions for a wellbore accessing the reservoir are made at block 410. These predictions may include velocity and pressure at various spatial points. As previously discussed, these predictions can be for the same wellbore where data was gathered to train the neural network, or another wellbore. At block 412, the computing device 140 determines a controllable parameter or controllable parameters for the wellbore equipment based on the predicted future properties. These parameter(s) are applied to equipment associated with the well at block 414. In the previously discussed example, the equipment includes valve 110, and the controllable parameters are applied within wellbore 112. The valve can be controlled to minimize water production from the subterranean reservoir and the controllable valve parameters can include a valve actuation time. Other controllable valve parameters can include valve state, as in whether the valve is opened or closed at the appropriate actuation time.

In testing, data was generated from 289 random points x and times t using the model above. The error between the analytical and predicted values for velocity and pressure of a subterranean reservoir were below 0.08 for velocity and 0.05 for pressure.

In some aspects, systems, devices, and methods for operating wellbore equipment using a data-driven physics-based model are provided according to one or more of the following examples:

Example #1: A method for controlling equipment associated with a wellbore includes receiving real-time data associated with a subterranean reservoir to be penetrated by the wellbore, training a neural network with the real-time data associated with the subterranean reservoir and a physics-based first principles model, using the neural network to determine a value for at least one controllable parameter, and controlling the equipment by applying the value of the at least one controllable parameter.

Example #2: The method of Example #1 wherein the equipment may feature one or more of equipment for wellbore formation, equipment for wellbore stimulation, or equipment for wellbore production.

Example #3: The method of Example #1 or Example #2 may feature using the neural network to minimize a function. The function may include a loss function. The function may be defined by a linear superimposition of the real-time data associated with the subterranean reservoir and the physics-based first principles model.

Example #4: The method of Examples #1-3 may feature using a linear superimposition of the real-time data associated with the subterranean reservoir and the physics-based first principles model to de-noise the real-time data and satisfy the physics-based first principles model.

Example #5: The method of Examples #1-4 wherein the equipment may feature at least one valve to minimize water production from the subterranean reservoir.

Example #6: The method of Examples #1-5 may feature a controllable parameter including a valve actuation time.

Example #7: The method of Examples #1-6 may feature a physics-based first principles model that includes a Navier-Stokes equation.

Example #8: The method of Examples #1-7 may feature a physics-based first principles model that includes one or more of velocity, viscosity, density, or pressure.

Example #9: The method of Examples #1-8 may feature equipment that is associated with a first wellbore and real-time data that is received from a second wellbore.

Example #10: A non-transitory computer-readable medium that includes instructions that are executable by a processing device for causing the processing device to perform the method of any of Examples #1-9.

Example #11: A system includes equipment associate with a wellbore, and a computing device. The computing device is operable to receive real-time data associated with a subterranean reservoir to be penetrated by the wellbore, train a neural network with the real-time data associated with the subterranean reservoir and a physics-based first principles model, use the neural network to determine a value for at least one controllable parameter, and control the equipment by applying the value of the at least one controllable parameter.

Example #12: The system of Example #11 may feature one or more of equipment for wellbore formation, equipment for wellbore stimulation, or equipment for wellbore production.

Example #13: The system of Example #11 or #12 may feature a computing device operable to use the neural network to minimize a loss function to determine the value.

Example #14: The system of Examples #11-13 may feature a computing device operable to minimize a loss function defined by a linear superimposition of the real-time data associated with the subterranean reservoir and the physics-based first principles model.

Example #15: The system of Examples #11-14 may include minimizing the loss function to de-noise the real-time data and satisfy the physics-based first principles model.

Example #16: The system of Examples #11-15 may feature at least one valve to minimize water production from the subterranean reservoir and the at least one controllable parameter may include a valve actuation time.

Example #17: The system of Examples #11-16 may feature a physics-based first principles model including a Navier-Stokes equation.

Example #18: The system of Examples #11-17 may feature a physics-based first principles model including one or more of velocity, viscosity, density, or pressure.

Example #19: The system of Examples #11-18 may feature equipment that is associated with a first wellbore and real-time data that is received from a second wellbore.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
equipment for at least one of formation of, stimulation of, or production from a wellbore; and
a computing device operable to:
receive real-time data associated with a subterranean reservoir to be penetrated by the wellbore;
train a neural network with the real-time data associated with the subterranean reservoir and a physics-based first principles model;
use the neural network to minimize a loss function to determine a value for at least one controllable parameter, the loss function being defined by a linear superimposition of the real-time data associated with the subterranean reservoir and the physics-based first principles model, and the loss function being configured to de-noise the real-time data and satisfy the physics-based first principles model; and
control the equipment by applying the value of the at least one controllable parameter.

2. The system of claim 1 wherein the equipment comprises at least one valve to minimize water production from the subterranean reservoir and the at least one controllable parameter comprises a valve actuation time.

3. The system of claim 1 wherein the physics-based first principles model comprises a Navier-Stokes equation.

4. The system of claim 3 wherein the physics-based first principles model comprises at least one of velocity, viscosity, density, or pressure.

5. The system of claim 1 wherein the equipment is associated with a first wellbore and the real-time data is received from a second wellbore.

6. The system of claim 1, wherein the computer device is further operable to predict future properties of the wellbore based on a velocity output or a pressure output of the loss function.

7. A method for controlling equipment associated with a wellbore, the method comprising:
receiving real-time data associated with a subterranean reservoir to be penetrated by the wellbore;
training a neural network with the real-time data associated with the subterranean reservoir and a physics-based first principles model;
using the neural network to minimize a loss function to determine a value for at least one controllable parameter, the loss function being defined by a linear superimposition of the real-time data associated with the subterranean reservoir and the physics-based first principles model, and the loss function being configured to de-noise the real-time data and satisfy the physics-based first principles model; and
controlling the equipment by applying the value of the at least one controllable parameter.

8. The method of claim 7 wherein the equipment comprises at least one valve to minimize water production from the subterranean reservoir and the at least one controllable parameter comprises a valve actuation time.

9. The method of claim 7 wherein the physics-based first principles model comprises a Navier-Stokes equation.

10. The method of claim 9 wherein the physics-based first principles model comprises at least one of velocity, viscosity, density, or pressure.

11. The method of claim 7 wherein the equipment is associated with a first wellbore and the real-time data is received from a second wellbore.

12. The method of claim 7, further comprising predicting future properties of the wellbore based on a velocity output or a pressure output of the loss function.

13. A non-transitory computer-readable medium that includes instructions that are executable by a processing device for causing the processing device to perform operations controlling equipment associated with a wellbore, the operations comprising:
receiving real-time data associated with a subterranean reservoir to be penetrated by the wellbore;
training a neural network with the real-time data associated with the subterranean reservoir and a physics-based first principles model;
using the neural network to minimize a loss function to determine a value for at least one controllable parameter, the loss function being defined by a linear superimposition of the real-time data associated with the subterranean reservoir and the physics-based first principles model, the loss function being configured to de-noise the real-time data and satisfy the physics-based first principles model;
using the neural network to determine a value for at least one controllable parameter; and
controlling the equipment by applying the value of the at least one controllable parameter.

14. The non-transitory computer-readable medium of claim 13 wherein the equipment comprises at least one valve to minimize water production from the subterranean reservoir and the at least one controllable parameter comprises a valve actuation time.

15. The non-transitory computer-readable medium of claim 13 wherein the physics-based first principles model comprises a Navier-Stokes equation.

16. The non-transitory computer-readable medium of claim 15 wherein the physics-based first principles model comprises at least one of velocity, viscosity, density, or pressure.

17. The non-transitory computer-readable medium of claim 13 wherein the equipment is associated with a first wellbore and the real-time data is received from a second wellbore.

18. The non-transitory computer-readable medium of claim 13, wherein the operations further comprise predicting future properties of the wellbore based on a velocity output or a pressure output of the loss function at a particular time and a particular spatial location.

* * * * *